INVENTOR.
WALTER SCHROEDER
BY H. K. Parsons & C. W. Wright

April 26, 1960
W. SCHROEDER
2,933,986
SPINDLE CONTROL MECHANISM
Filed Sept. 30, 1955
4 Sheets-Sheet 2
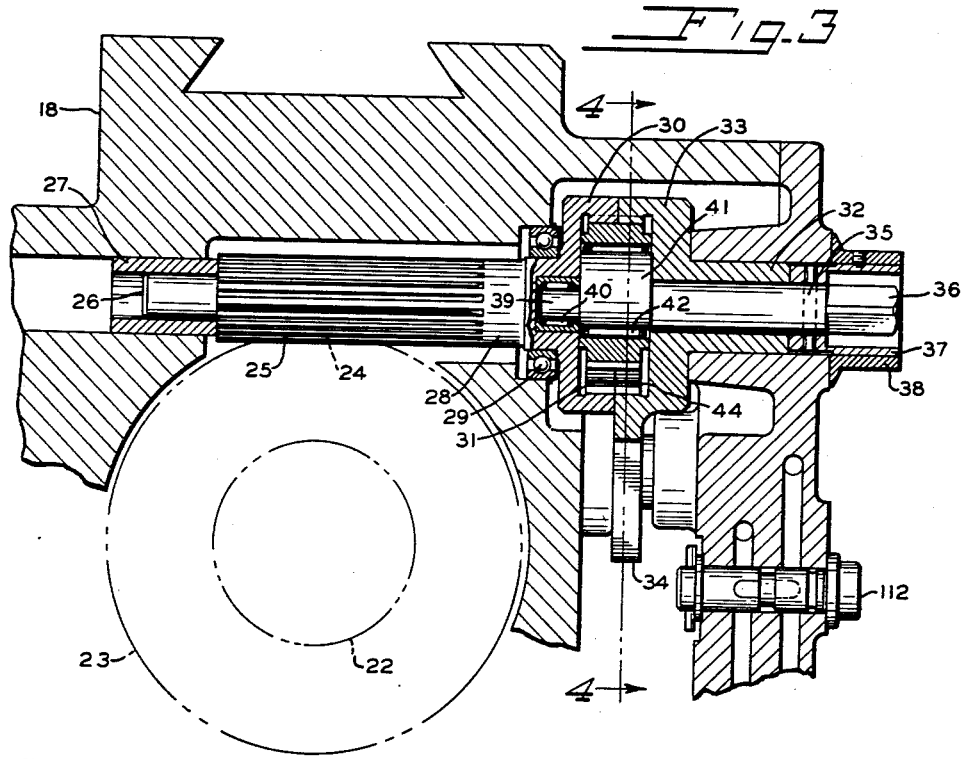
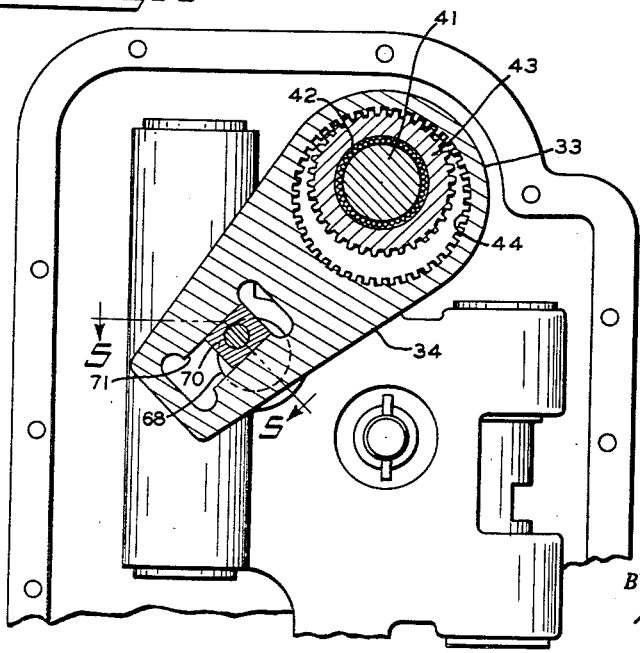
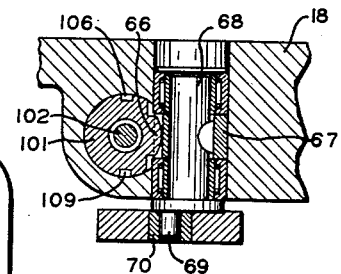
INVENTOR.
WALTER SCHROEDER
BY
H. K. Parsons & C. W. Wright.

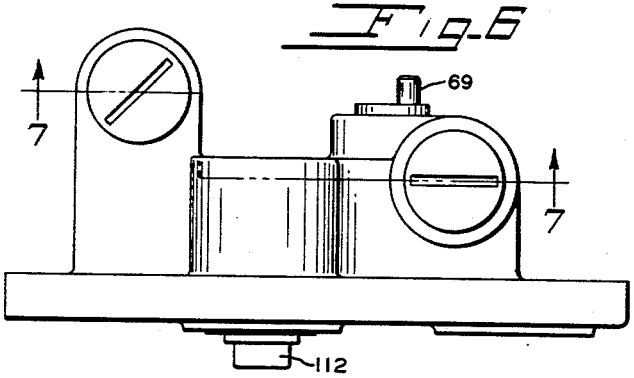
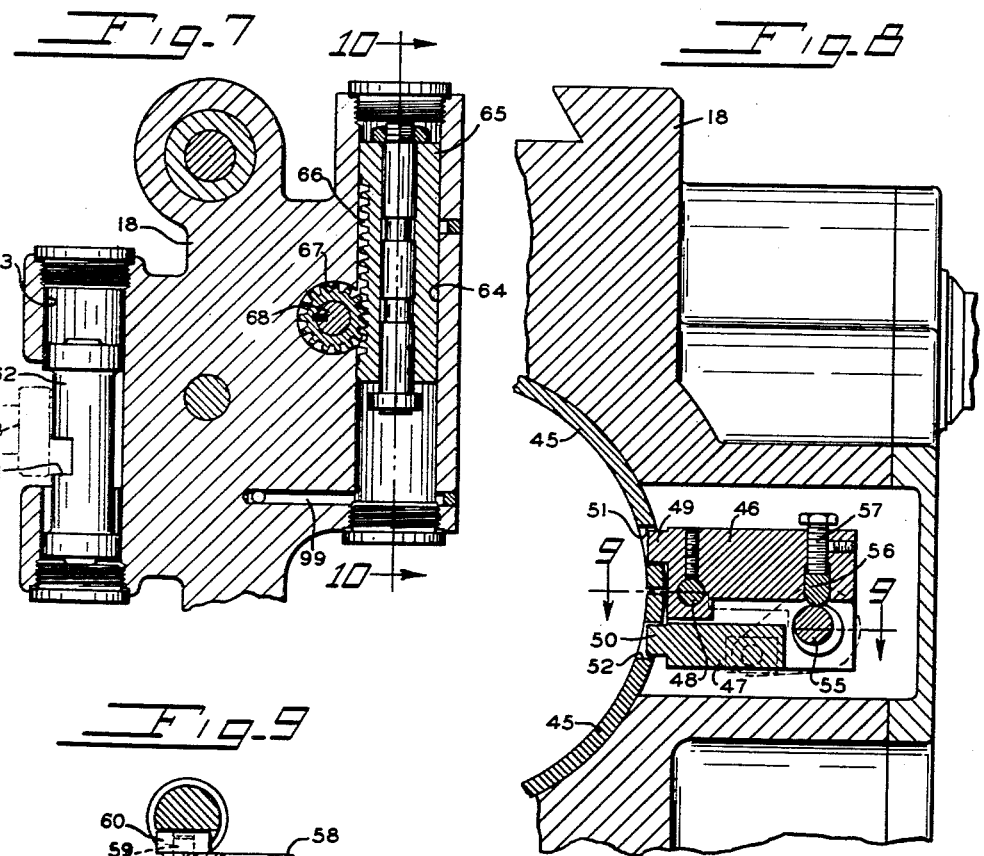
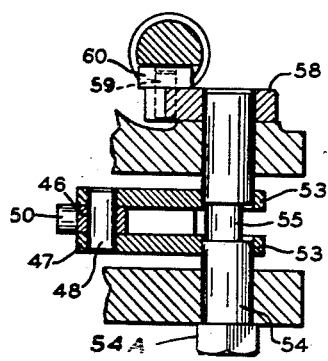

April 26, 1960 W. SCHROEDER 2,933,986
SPINDLE CONTROL MECHANISM
Filed Sept. 30, 1955 4 Sheets-Sheet 4
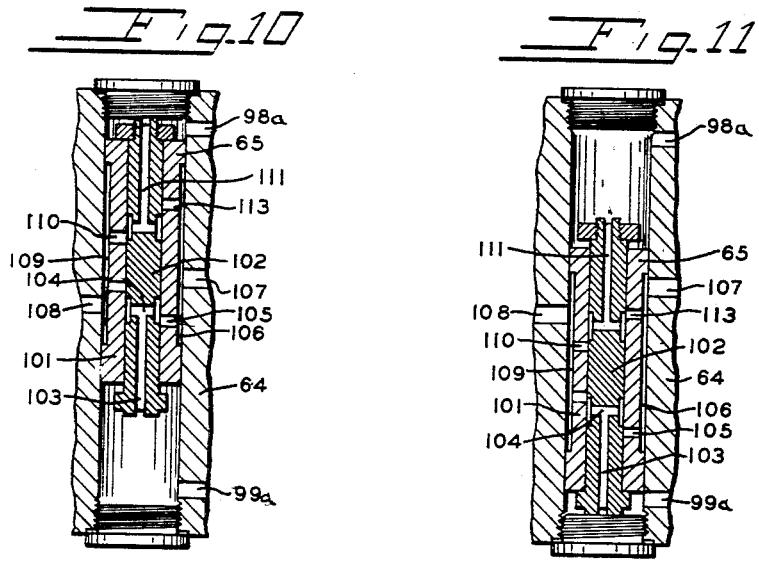
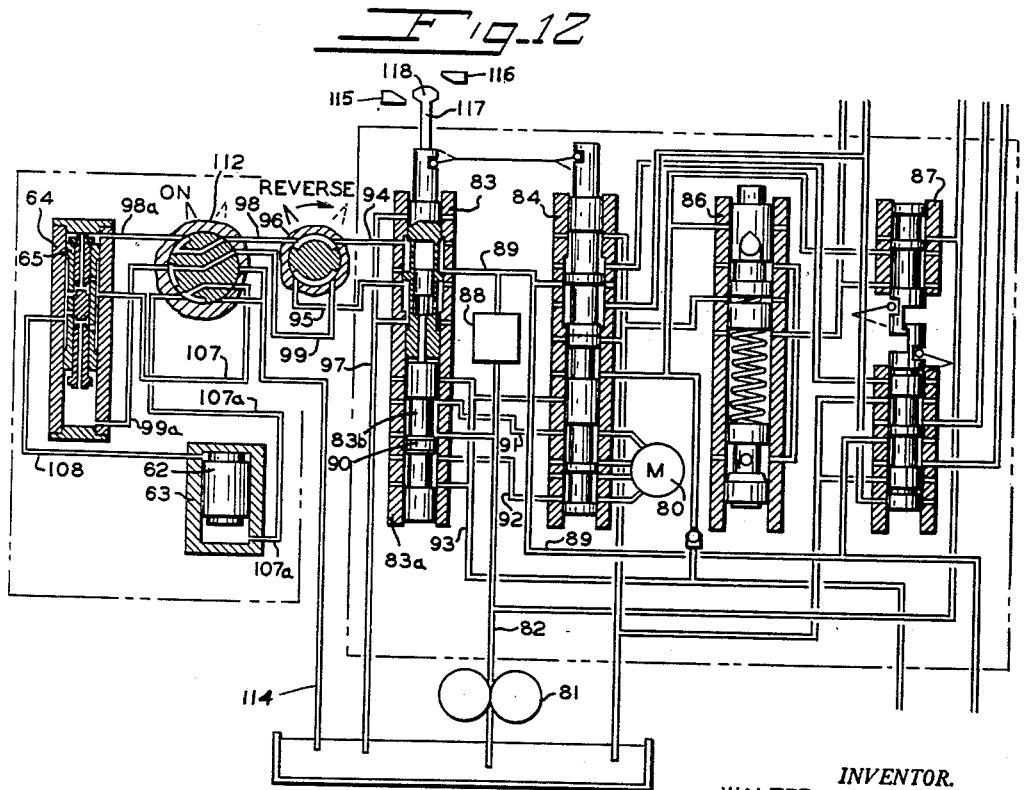
INVENTOR.
WALTER SCHROEDER
BY
H. H. Parsons + L. W. Wright.

United States Patent Office 2,933,986
Patented Apr. 26, 1960

2,933,986

SPINDLE CONTROL MECHANISM

Walter Schroeder, Cincinnati, Ohio, assignor to The Cincinnati Milling Machine Co., Cincinnati, Ohio, a corporation of Ohio Application September 30, 1955, Serial No. 537,692

13 Claims. (Cl. 90—16)

This invention relates to improvements in milling machines and has particular reference to a novel and improved mechanism for controlling the cutter position in such machines.

In the performance of milling operations, particularly when using face mill or like type of cutters, it is frequently customary to advance the work table carrying the work piece in one direction at a feeding rate past the cutter and then rapidly return the table and work to original loading position. This involves carrying the previously milled surface of the work piece transversely of the cutter during the return stroke with attendant possibility of marring of the surface of the work or damage to the cutter during the retracting movement.

It is, therefore, one of the objects of the present invention to provide a novel and improved mechanism for effecting a relative separation of the work and cutter during the return stroke to prevent any possible interengagement of these parts.

A further object of the invention is the provision of an improved milling machine structure including an automatic quill retracting mechanism, together with selector means for rendering the retracting mechanism either effective or ineffective as may be desired for a particular milling operation.

An additional object is the provision in connection with a hydraulically operated milling machine or like machine tool table and its controls of associated control mechanism operable by the hydraulic drive of the machine in conjunction with said existing controls for determining the positioning and clamping of the cutter supporting quill of the machine.

Another object of the invention is the provision of a mechanism of the character set forth above which may be rendered selectively effectible in either direction of operation of the machine tool table.

It is also an object of the invention to provide in connection with an automatic quill projecting and retracting mechanism, a sequence control device for automatically determining the unclamping of the quill, movement of the quill and reclamping of the adjusted member.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is a transverse section through the quill on the line 3—3 of Figure 2.

Figure 4 is a section through the automatic retraction mechanism on the line 4—4 of Figure 3.

Figure 5 is a detail section through the quill shifting arm on line 5—5 of Figure 4.

Figure 6 is a plan view of the quill piston control bracket.

Figure 7 is a section on the line 7—7 of Figure 6.

Figure 8 is a transverse section through the brake mechanism on the line 8—8 of Figure 2.

Figure 9 is a detail section through the clamp structure on the line 9—9 of Figure 8.

Figures 10 and 11 are sections through the contained valve mechanism of the quill adjusting piston, and Figure 12 is a diagrammatic view of the essential related portions of the hydraulic control circuit for the table movement and quill control features of the machine.

Figure 1:
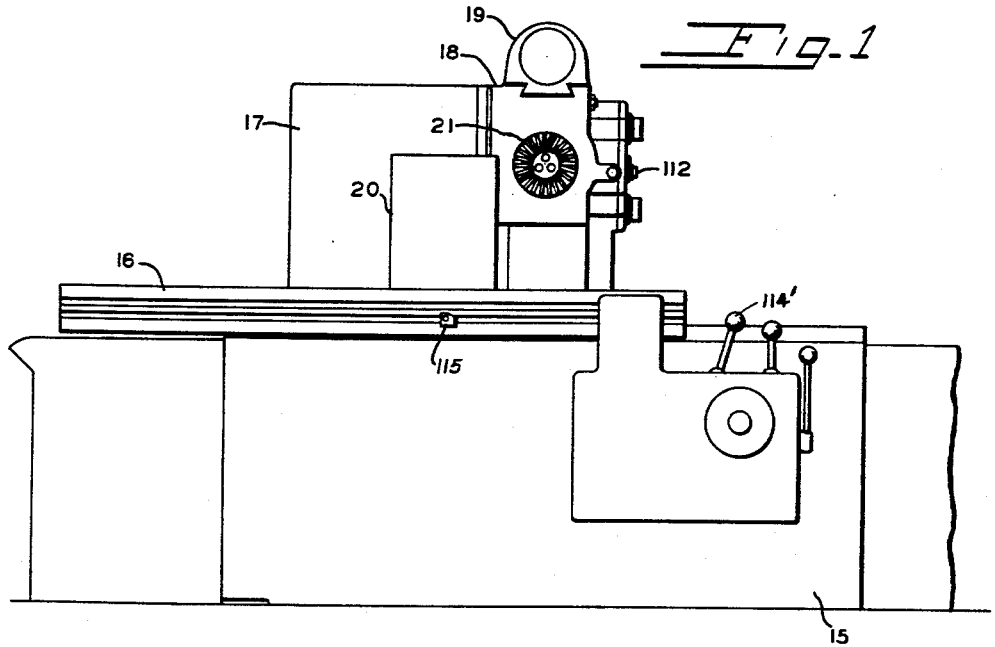
Figure 1 is a front elevation of a machine embodying the invention.
Figure 2:
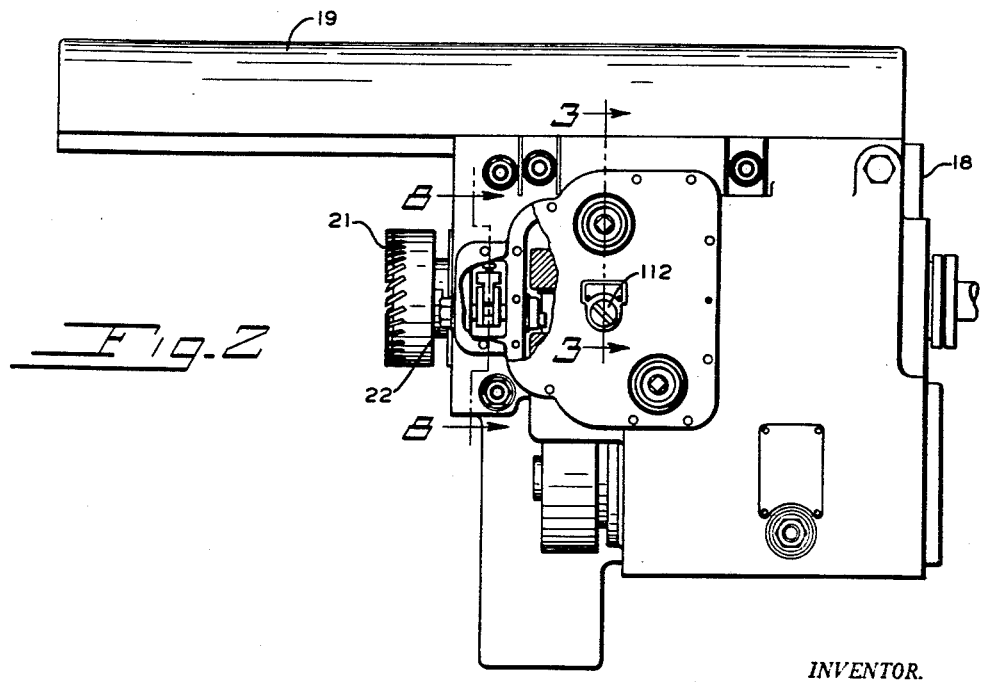
Figure 2 is a fragmentary side elevation of the quill carrier portion of the machine and associated parts.

In the drawings in which similar reference characters indicate the same or corresponding parts throughout the several views, the numeral 15 designates the bed of a milling machine having the translatable table 16. Rising from the bed is the column 17 supporting the adjustable spindle carrier 18 with its overarm 19. The table 16 is adapted to support a work piece as indicated at 20 for transverse movement with respect to a cutter such as the face mill 21 as indicated in Figures 1 and 2. This face mill or other cutter is mounted on the cutter spindle 22 rotatably supported by a quill 23 secured against rotation but for axial or longitudinal movement with respect to the spindle carrier 18.

For controlling the longitudinal movement of the quill, the quill is provided with a rack portion 24 meshing with the pinion 25 having a pilot end 26 rotatable in the bush 27 of the carrier 18. At its opposite end the pinion shaft 28 is supported in the carrier by anti-friction bearings 29 and has the terminal cupped or flanged portion 30 formed with the internal gear teeth 31. Disposed co-axial with the shaft 28 is the sleeve 32 having a flanged or cupped portion 33 abutting the cupped portion 30 of shaft 28 and having integral therewith or secured thereto the quill shifting rock arm 34. Rotatable within the sleeve 32 is the spindle or shaft 35 having a squared outer end 36 for engagement by a suitable wrench or handle, while secured on the outer portion of the shaft 35 is the bushing or sleeve 37 carrying the position indicating dial 38.

The inner end of the member 35 has a pilot portion 39 rotatably supported in a bearing 40 in the end of the shaft 28 and has a cam or eccentric portion 41 disposed in the chamber enclosed by the abutting cup portions 30 and 33. Rotatably mounted on the eccentric 41 and supported by the anti-friction bearings 42 is a gear 43 having its teeth meshing at one side jointly with the internal teeth 31 of the cup 30 and the internal teeth 44 of the cup 33. There is preferably a slight differential of one or more teeth between the number of the teeth 31 and the number of the teeth 44 with the result that when gear 43 is bodily moved in a planetary or orbital path by rotation of the eccentric, the teeth of the gear will roll around jointly on the internal teeth 31 and 44 but due to the difference in the number of said teeth 31 and 44 a slight relative incremental movement will take place between the members 30 and 33. Since during this operation the arm 34 is held stationary with respect to the spindle carrier 18, this will result in a rotation of pinion 25 imparting either forward or back movement to the quill 23 and its associated spindle depending upon the direction of rotation of shaft 35. The amount of such positional movement of the quill will be indicated by suitable graduations on the dial 38.

The foregoing mechanism is designed for use in accurate positioning of the cutter 21 for performance of a milling operation on a selected surface or surfaces of a work piece 20. As considerable pressure, tending to displace the quill, is frequently exerted during a milling operation, suitable means, such as the annular spring brake band 45, supported by the carrier 18 and extending around the quill, may be advantageously employed for clamping the quill in its adjusted position. Clamping or release of the band 45 is effected by the clamp levers 46 and 47 intermediately pivoted at 48 and having the lugs 49 and 50 fitting in the sockets 51 and 52 at the ends of the brake band for tightening the band about the quill when the outer ends of the levers 46 and 47 are separated. Rotatably mounted in the carrier and in the flanges 53 of the member 47 is the rock shaft 54 having the intermediate eccentric portion 55 abutting plunger 56 adjustable by set screw 57 relative to its supporting member 46.

By reference to Figure 8 it will be evident that as the shaft 54 is oscillated, the eccentric 55 will exert a cam action against the lower end of the abutment 56, swinging the outer portion of member 46 upward and thus drawing together the lugs 49 and 50 to tighten the brake band 45. Oscillation in the opposite direction will, of course, release this clamping pressure of the brake band. Shaft 54 has a squared end 54a to receive a handle or wrench for manual clamping.

For determining the clamping and unclamping oscillation of the rock shaft 54 it has secured on one end the arm 58 carrying a pin 59 fitting into the slide block 60. As particularly shown in Figures 7 and 9, slide block 60 fits into the transverse way 61 of clamp piston 62 reciprocable in hydraulic cylinder 63 supported by the carrier 18. The carrier additionally supports a second cylinder 64 containing a piston unit designated as an entirety by the character 65. This piston unit has a central rack portion 66 engaging pinion 67 on shaft 68 journaled in the carrier 18 and has on one end the eccentric pin 69 supporting slide block 70 movable in the slot 71 of rock arm 34. By reference particularly to Figure 4 it will be evident that as the shaft 68 is rotated half of a revolution by reaction of piston 65 on its pinion 67, the arm 34 will be given a counterclockwise rocking movement from the starting position shown equal to twice the eccentricity of pin 69 which would be a maximum in any case due to the nature of the eccentric. Under these conditions, the teeth of gear 43 will remain interlocked with the teeth 31 and 44 of the cups 30 and 33 so that these parts will move as a unit. The rocking movement instigated and effected by piston 65 will be transmitted to shaft 28. This will rotate pinion 25 to effect an extent of projection or retraction of the quill determined by the eccentricity of the crankpin and the rotation effected by the piston and since the piston has a fixed stroke the movement of the quill will always be the same.

In Figure 12 there has been indicated a hydraulic diagram showing the essential features of the table movement and automatic quill retraction controls forming the subject matter of the present invention, the general hydraulic circuit applicable to the present machine having been shown in greates detail in my copending application, Serial No. 533,402.

In the present diagram there has been indicated for reciprocation of the table the reversible hydraulic motor 80 to which hydraulic actuating medium is supplied by a pump or pumps 81 discharging into the pressure conduit 82. Flow of pressure to and from the hydraulic motor is determined by selective positioning of the reversing valve 83 in series with the feed and rapid traverse selector valve 84, while the rate of operation of the motor is controlled by suitable throttle mechanism within the adjustable rate valve 86, and the start and stop of the table determined by suitable positionings of the start and stop valve 87.

Branching from the pressure conduit 82 by way of the pressure reducing valve 88 is the preferably lower or pilot pressure conduit system 89. As the control of the quill retraction, as shown, is dependent on certain portings of the direction control or reverse valve 83, the structure of this valve only has been described in detail, as suitable known conventional valving or alternatively the specific valving shown may be employed in connection with the general circuitry as shown for determination of the other machine movements.

Referring to Figure 12, the reverse and quill retraction control valve 83 comprises the valve casing 83a containing a plunger designated as an entirety by the numeral 83b. Ported into the casing 83a is the pressure conduit 82 selectively coupleable upon movement of the spool 90 with the respective motor conduits 91 and 92, these conduits being alternatively connectible by said movement of the spool with the return conduit system 93. Ported into the upper portion of the valve casing 83a is the pilot pressure conduit 89 alternatively connectible by movement of the valve 83b with either conduit 94 or conduit 95, these conduits extending to the interchange or switch valve 96. When either conduit 94 or 95 is connected to the pilot pressure conduit 89, the other of said conduits is connected to the low pressure conduit return system 97.

In the position shown in the drawings the conduits 94 and 95 are connected respectively to the conduits 98 and 99, but by movement of the switch valve 96 these connections may be interchanged, therefore subjecting the automatic quill carrier retraction to either right hand or left hand reverse valve determined movement of the table, the operation in either instance being otherwise the same.

The position of the reversing valve plunger 83b may be controlled either manually from the control lever 114', or may be automatically trip controlled.

As shown in Figures 1 and 12, the reciprocating table carries the reversing trip dogs 115 and 116 whose cam surfaces react against suitable trip mechanism, indicated as a plunger 117 having a double tapered head 118. Engagement of one or the other of these dogs with the plunger 117 will effect automatic trip actuation of the table reversing and quill control mechanisms. If desired, use may be made of conventional load and fire mechanism, one form of which is shown in Patent 1,125,905 for completing the trip initiated movement of valve control plunger 117 and valve 83b.

The conduits 98 and 99 extend to the cylinder or casing 64 in which the piston 65 is movable and serve to control the movement of that piston and thus the direction of movement of the quill. In Figure 10 the combined piston and valve structure has been shown in the raised position or, in other words, the position occupied by the parts when the reversing valve has been shifted to cause movement of the table 16 to the left, thus introducing pressure from 89 to 95 and 99. This pressure introduced in the lower end of cylinder 64 is shown as having moved the piston 65 upward in correspondence with the position indicated in Figure 7. The piston identified as an entirety in Figure 7 by the numeral 65 in practice comprises an outer sleeve portion 101 and an inner plunger portion 102. The plunger portion 102 has at its lower end the drilled passage 103 and intersecting cross passage 104 communicating in the position of parts shown by way of passage 105 in sleeve 101 with the exterior groove 106. This groove couples the pressure with conduit 107 extending to the lower end of cylinder 63 shifting the piston 62 to effect clamping movement of the eccentric 55 as described in connection with Figures 7 and 8. At the same time conduit 108 from the opposite end of cylinder 63 is coupled by way of groove 109 and port 110 of sleeve 101 and the cross and longitudinal drillings 111 at the upper end of plunger 102 with the upper end of the cylinder 64. From this end of 64 the connection is by way of conduit 98, valve 96 and conduit 94 and the reversing valve to the low pressure return conduit system. It will thus be seen that in this particular instance in connection with the positioning of the reversing valve that the quill has been automatically retracted and clamped in its retracted position.

To understand the opposite functioning of the apparatus, attention is invited to Figure 11 illustrating the same parts but with a different pressure condition. When the reverse valve is shifted to reverse the direction of table movement pressure conditions will likewise be reversed as respects conduits 98 and 99. Conduit 98 will then become a pressure conduit and conduit 99 an exhaust conduit. This connection will release the pressure in the lower end of the clamp cylinder 63 and introduce pressure into the upper end through conduit 108 to release the quill clamp. Piston sleeve 101 and plunger 102 will move downwardly as viewed in Figure 11, causing forward movement of the spindle quill. As the lower end of plunger 102 reaches its limit of stroke, by engagement with the end of cylinder 64, sleeve 101 will have a continued downward movement taking up the lost motion between the end of the sleeve and the shoulder on the valve plunger 102. This movement will close off the connection from 108 by way of the interdrilling 111 and at the same time open the connection from 111 through the port 113 to conduit 107, which will introduce pressure into the lower end of cylinder 63 reactuating the quill clamp to securely clamp the quill in operative position at the termination of the shifting movement effected by piston 63.

From the foregoing it will be seen that there has been provided a simple but efficient and effective mechanism in which movement of the reversing valve for controlling the movement of the table to the right or to the left with respect to the bed, depending on the position of the selector 96, insures automatic shifting and clamping of the quill, spindle and cutter in a forward position for the cutting operation during one direction of table movement, but simultaneously with shifting of the table reversing valve serves automatically and sequentially to unclamp, retract and reclamp the quill in its retracted position.

This automatic quill advance and retraction feature may be used, if desired, or alternatively may be rendered ineffective by suitable setting of the selector 112. In its "on" position the valving of the selector connects 98 and 98a on the one hand, 99 and 99a on the other, and additionally serves as a connector between sections 107 and 107a of the conduit for effecting the unclamping or releasing movement of the piston 62. In its "off" position the selector couples the pressure conduit 99 to the conduit 98a, causing unclamping and forward or projected movement of the quill and spindle, while at the same time connecting 99a and 107a to low pressure or exhaust conduit 114 so that no force can be exerted against the respective pistons for either clamping or retraction of the quill.

Under these conditions the position of the quill can be adjusted by manual rotation of shaft 35 and the parts clamped in adjusted position by manual actuation of shaft 54.

What is claimed is:

1. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft and having an elongated slot spaced from said shaft substantially normal to the direction of rocking movement of said arm, means operatively connecting the pivot end of said arm to said shaft, means to rock said arm about its pivot including an eccentric having a crank pin received in said slot, said crank pin swingable between two extreme positions on a line substantially normal to the directions of said slot, and a power actuable means for oscillating said eccentric to advance or retract said quill.

2. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft and having an elongated slot spaced from said shaft substantially normal to the direction of rocking movement of said arm, means operatively connecting the pivot end of said arm to said shaft, means to rock said arm about its pivot including an eccentric having a crank pin received in said slot, a power actuable means for oscillating said eccentric to advance or retract said quill, said power actuable means including a fixed stroke piston, and a motion transmitting means connecting said piston for rotation of said eccentric half a revolution on each stroke of the piston, said crank pin swinging between two extreme positions on said rotation of the eccentric, said extreme positions of the crank pin lying on a line normal to the direction of said slot.

3. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a fixed stroke piston, rack and pinion means connecting said piston to said eccentric, whereby at the end of each stroke effected by hydraulic pressure the quill will be held in one of its positions.

4. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, differential gearing connecting the pivoted end of said arm to said shaft whereby rocking of said arm will rock said shaft, means to rock said arm about its pivot including an eccentric having a crank pin engaging said arm, power actuable means for oscillating said eccentric to advance or retract said quill, said power actuable means including a cylinder containing a fixed torque piston, rack and pinion means connecting said piston to said eccentric, means to admit fluid pressure to said cylinder to effect shifting of said quill and holding it locked in its shifted position, and means to operate said differential to further advance or retract said quill with respect to said shifted position.

5. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively whereby said piston will be held at one end of said cylinder, a quill clamping cylinder, a lost motion valve means in said piston and positioned thereby to connect the pressure in said cylinder to said clamping cylinder to clamp the quill, and means to actuate said reverse valve to reverse the pressure connection to said cylinders whereby the clamp will be released and the quill shifted.

6. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively whereby said piston will be held at one end of said cylinder, a quill clamping cylinder, a lost motion valve means in said piston and positioned thereby to connect the pressure in said cylinder to said clamping cylinder to clamp the quill, and means to actuate said reverse valve to reverse the pressure connection to said cylinders whereby the clamp will be released and the quill shifted, said lost motion valve means being shifted at the end of the piston stroke to reclamp said quill.

7. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively whereby said piston will be held at one end of said cylinder, a quill clamping cylinder, a lost motion valve means in said piston and positioned thereby to connect the pressure in said cylinder to said clamping cylinder to clamp the quill, and means trip operable by the table at reversal thereof for actuating said reverse valve to reverse the pressure connections in said cylinders whereby the clamp will be released and the quill shifted.

8. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively, whereby said piston will be held at one end of the cylinder to hold the quill in its advanced position, a quill clamping cylinder, a lost motion valve means in said piston and positioned thereby to connect the pressure in said cylinder to said clamping cylinder to clamp the quill, means to advance the table to effect a cutting operation, automatic trip operable means to reverse the table for the cutting operation, means simultaneously operable by said trip operable means to shift said reverse valve to reverse the pressure connections to said cylinder whereby the clamp will be released and the quill retracted, said lost motion valve means being shifted at the end of the piston stroke to reclamp said quill in its retracted position.

9. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively, whereby said piston will be held at one end of the cylinder to hold the quill in its advanced position, a quill clamping cylinder, a lost motion valve means in said piston and positioned thereby to connect the pressure in said cylinder to said clamping cylinder to clamp the quill, means to advance the table to effect a cutting operation, automatic trip operable means to reverse the table for the cutting operation, means simultaneously operable by said trip operable means to shift said reverse valve to reverse the pressure connections to said cylinder whereby the clamp will be released and the quill retracted, said lost motion valve means being shifted at the end of the piston stroke to reclamp said quill in its retracted position, and switchover valve means between said reversing valve and said cylinder to reverse the effect of said reversing valve on said cylinder upon shifting of said switchover valve means.

10. In a machine tool having a bed, a table reciprocably mounted on the bed, a spindle carrier and a cutter spindle quill slidably mounted in the carrier for movement between an advanced position and a retracted position, the combination of means for moving said quill including a rack on said quill, a pinion rotatably supported by the carrier in mesh with said rack, said pinion having an actuating shaft, a rock arm pivoted in the carrier coaxially of said shaft, means operatively connecting the pivot end of said arm to said shaft, means to rock said arm about its pivot including an eccentric having a crank pin engaging said arm, a power actuable means for oscillating said eccentric to advance or retract said quill, said power actuable means including a cylinder containing a piston, motion transmitting means connecting the piston for rotation of said eccentric, a reversing valve for connecting opposite ends of said cylinder to pressure and exhaust respectively, whereby said piston will be held at one end of the cylinder to hold the quill in its advanced position, a quill clamping cylinder, a lost motion valve means in said piston and positioned thereby to connect the pressure in said cylinder to said clamping cylinder to clamp the quill, means to advance the table to effect a cutting operation, automatic trip operable means to reverse the table for the cutting operation, means simultaneously operable by said trip operable means to shift said reverse valve to reverse the pressure connections to said cylinder whereby the clamp will be released and the quill retracted, said lost motion valve means being shifted at the end of the piston stroke to reclamp said quill in its retracted position, switchover valve means between said reversing valve and said cylinder to reverse the effect of said reversing valve on said cylinder upon shifting of said switchover valve means, and additional valve means between said reversing valve and cylinder to disconnect said cylinder from said reversing valve means.

11. A mechanism for advancing and retracting the quill of a machine tool and clamping the quill in both the advanced and retracted position, said machine tool having a source of pressure, the mechanism comprising: a cylinder having a piston slidably received therein, said piston defining chambers with the cylinder at the ends of the cylinder, each of said chambers having a port, said piston having a valve member shiftable between two extreme positions in relation to the piston; means selectively to supply pressure to said chamber ports to move the piston from one end of the cylinder to the other; means to shift the piston valve member from one extreme position to the other when the piston is at the ends of the cylinder; a clamp port and a release port in the cylinder covered by the piston; means responsive to pressure at the clamp port to clamp the quill; means responsive to pressure at the release port to release the quill; means defining a passage through the piston from the chamber which has the actuating pressure port at one end of the cylinder to the clamp port when the piston valve member is in the extreme position to which it is shifted at the other end of the cylinder; means defining a passage through the piston from the chamber at the other end of the cylinder to the release port when the piston valve member is in said extreme position at said other end of the cylinder; and means responsive to the pressure supplied at the chamber ports, respectively, to advance and retract the quill.

12. A mechanism for advancing and retracting the quill of a machine tool and clamping the quill in both the advanced and retracted position, said machine tool having a source of pressure, the mechanism comprising: a cylinder having a first and a second pair of ports, said second pair of ports being covered at all times by the piston; means selectively to connect one or the other of said first pair of ports to the source of pressure; a piston having a valve member movable between two extreme positions in relation thereto, the piston movable back and forth between two terminal positions at either end of the cylinder in response to pressure at the first pair of ports; means to move said piston valve member from one extreme position to the other when the piston reaches a terminal position; means connected to said second pair of ports to clamp the quill in response to pressure at one of said ports and release the quill in response to pressure at the other of said ports; means defining a passage through the piston from one of said first pair of ports to the clamping port of said second pair and from said other port of the first pair to the clamp releasing port when the piston valve member is in one extreme position to which it is shifted when the piston is at one terminal position; means defining a passage through the piston from the other of said first pair of ports to the clamping port of said second pair of ports and from said one port of said first pair to the clamp releasing port when the piston valve member is in the other extreme position to which it is shifted when the piston is at the other terminal position; and means operatively connecting the piston to said quill.

13. A mechanism for advancing and retracting the quill of a machine tool in coordination with the movement of the reciprocating work supporting table and clamping the quill in both the advanced and retracted position, said machine tool having a source of pressure, the mechanism comprising: a quill actuating cylinder having a first port and a second port; means responsive to the movement of the table to connect said first port to pressure and said second port to exhaust at one end of the table stroke and connect said first port to exhaust and said second port to pressure at the other end of the table stroke; a piston comprising a plunger having a sleeve movable in relation to the plunger between two extreme positions, said piston movable back and forth between the ends of the quill actuating cylinder in response to pressure at the first and second ports, respectively, the piston engaging the cylinder at each end to move the sleeve from one extreme position to the other; means operatively connecting the quill to the piston for advancement and retraction as the piston moves back and forth between the ends of the cylinder; a clamping cylinder; means defining a first and second passage between the quill actuating cylinder and the ends, respectively, of the clamping cylinder; means defining passages in the sleeve and plunger connecting said first passage to said first port and said second passage to said second port when the piston is at one end of the cylinder and the sleeve is in one extreme position after movement in response to pressure at said first port; means defining passages in the sleeve and plunger connecting said first passage to said second port and said second passage to said first port when the piston is at the other end of the cylinder and the sleeve is in the other extreme position after movement in response to pressure at said second port; means defining passages in the sleeve and plunger connecting said second passage to said first port and said first passage to said second port when the piston is moving toward said one end of the cylinder in response to pressure at said first port; and means defining passages in the sleeve and plunger connecting said second passage to said second port and said first passage to said first port when the piston is moving toward said other end of the cylinder in response to pressure at said second port.

References Cited in the file of this patent
UNITED STATES PATENTS

| | | |
|---|---|---|
| 452,991 | Colburn | May 26, 1891 |
| 927,432 | Seward | July 6, 1909 |
| 2,106,835 | Forward | May 28, 1937 |
| 2,293,880 | Armitage et al. | Aug. 25, 1942 |
| 2,615,372 | Coffin | Oct. 28, 1952 |
| 2,633,061 | Roehm et al. | Mar. 31, 1953 |
| 2,766,847 | Harter | Oct. 16, 1956 |